United States Patent
Ciemiewcz

(10) Patent No.: US 6,695,493 B2
(45) Date of Patent: Feb. 24, 2004

(54) OPTICAL FIBER UTILIZATION FOR VCSEL DRIVEN COMMUNICATIONS

(75) Inventor: Jon T. Ciemiewcz, Litchfield, NH (US)

(73) Assignee: BAE Systems Information and Electronic Systems Integration Inc, Nashua, NH (US)

( * ) Notice: Subject to any disclaimer, the term of this patent is extended or adjusted under 35 U.S.C. 154(b) by 30 days.

(21) Appl. No.: 09/973,589

(22) Filed: Oct. 9, 2001

(65) Prior Publication Data

US 2002/0041741 A1 Apr. 11, 2002

Related U.S. Application Data

(60) Provisional application No. 60/238,817, filed on Oct. 6, 2000.

(51) Int. Cl.[7] ................................................. G02B 6/36
(52) U.S. Cl. .............................. 385/89; 385/88; 385/14; 385/53; 385/24
(58) Field of Search ............................. 385/89, 88, 49, 385/92, 93, 94, 53, 54, 115, 116, 901, 24, 14

(56) References Cited

U.S. PATENT DOCUMENTS

| | | | | |
|---|---|---|---|---|
| 5,557,693 A | * | 9/1996 | Stevens et al. | 385/24 |
| 5,650,612 A | | 7/1997 | Criswell et al. | 250/226 |
| 5,857,042 A | | 1/1999 | Robertson et al. | 385/33 |
| 6,088,376 A | | 7/2000 | O'Brien et al. | 372/50 |
| 6,116,791 A | | 9/2000 | Laninga et al. | 385/83 |
| 6,117,193 A | | 9/2000 | Glenn | 29/25.01 |
| 6,398,425 B2 | * | 6/2002 | Williams et al. | 385/89 |
| 6,399,936 B1 | * | 6/2002 | Hang et al. | 250/216 |
| 6,459,842 B1 | * | 10/2002 | Arsenault et al. | 385/134 |
| 6,530,700 B2 | * | 3/2003 | Williams | 385/92 |
| 6,545,425 B2 | * | 4/2003 | Victor | 315/169.3 |

OTHER PUBLICATIONS

Sundaram et al., "Self Aligning Optical Interconnect . . . " Pub. No. U.S. 2001/0040714A1, published Nov. 15, 2001.*
Yeh, "VCSEL Structure . . . ", Pub. No. U.S. 2003/0031218A1, published Feb. 13, 2003.*
Ciemiewicz, "Optical Fiber Utilization for VSCEL . . . ", Pub. No. 2002/0041741 A1, published Apr. 11, 2002.*
PCT International Search Report dated Dec. 26, 2001 of International Application No. PCT/US01/42567 filed Oct. 9, 2001.

* cited by examiner

Primary Examiner—Brian Healy
(74) Attorney, Agent, or Firm—Maine & Asmus

(57) ABSTRACT

An optical data transmission link with improved fiber utilization. VCSEL and detector elements are configured on an optical matrix array with allocated surface area footprints at standard industry pitch dimensions, the elements of alternate rows and columns being offset from centerline of their footprints in opposite directions so as to create a pattern of sets of two or four adjacent optical elements operating at a common or differential wavelengths. A connector provides offset alignment of the fiber bundle to the matrix array so as to align a single fiber of standard industry diameter equal to the pitch of the array, with the center of each multi-element set so the fiber core diameter spans all elements of the set. The required modification to standard commercial mask design and chip fabrication is within the scope of present fiber optic technology.

30 Claims, 1 Drawing Sheet

OPTICAL FIBER UTILIZATION FOR VCSEL DRIVEN COMMUNICATIONS

This application claims priority for all purposes to pending application U.S. Ser. No. 60/238,817 filed Oct. 6, 2000, by the same inventor.

FIELD OF THE INVENTION

This invention relates to short reach optical interconnects consisting of optical emitters in the form of VCSEL (Vertical Cavity Surface Emitting Laser) arrays and photo detector array for transmitting data through optical fibers, and in particular to techniques for enabling multiple optical emitters to transmit over a single fiber.

BACKGROUND

Data communications rely heavily on fiber optic transmission to achieve the required speed and bandwidth. Electro optical transducer arrays for converting electrical data signals into optical emissions are coupled with careful alignment to fiber bundles for transmitting the light signals over both short and long distances to photo detector arrays which convert the light back into electrical signals for further processing.

The current implementations of these fiber optic interconnects commonly couple a matrix array of N VCSELs configured in a row/column pattern at an industry standard pitch, emitting light signals at an industry standard frequency, to an equal number of single or multi mode optical fibers of industry standard diameter. A single VCSEL is allocated a specific surface area footprint nominally equal to the row/column pitch, and transmits its light pulses from its vertical cavity, which is uniformly disposed in a common position within the footprint. The light is directed into a first end of a single optical fiber and hence to a single detector of the same frequency at the other end of the fiber. This makes up a channel or optical link.

Conventionally, differential signal transmission implemented in the supporting circuitry switches the signal between two active transmitter/detector sets, so as to make signal detection easier and more reliable at the receiving end. The current practice requires two channels or VCSEL/fiber/detector links; where the high/low or 1 and 0 signal switching is alternated between the links for respective high and low signal elements. The received signals of the two links are recombined by supporting circuitry at the receiving end for processing.

Current industry practice is based on commercially available 850 nanometer VCSELs from a number of vendors, commercially available multi mode optical fiber and detectors that use quantum well structures with the same wave length characteristics as the VCSEL transmitters.

The technology for transmission of data by photonic means started with a single laser transmitted into a single fiber with a detector at the other end. These links were first developed for use by the phone companies and then later used for implementation of data transmission over the world wide web. The edge emitting 1300 nanometer lasers that are used to accomplish these links have grown from single frequency devices to multiple frequency devices that are used to accomplish wave division multiplexed WDM transmissions. The use of WDM provides the capability to transmit numerous data streams through a single multi mode fiber thereby reducing the number of fibers required to transmit massive amounts of data from different sources.

The implementation for short haul fiber optic data transmission which uses 850 nanometer VCSELs and detectors started with optical ether net which uses a single fiber per transmitter/detector pair per link. This has been expanded to implementations that use one-dimensional and two-dimensional arrays of these links to satisfy the industry bandwidth requirements. These implementations, however, still use a fiber per link. VCSELs and detectors that operate at 850 nanometers are used in these arrays in products currently on the market under the trade names of Parolli and TC48. (No claim is made to these marks.) The fiber and connectors used in these links are a significant cost driver for the products.

The current short haul fiber optic data interconnects are limited by two factors. The first factor is the speed limitations of the ASIC drivers and demodulators, which interface the electronic inputs and outputs to the photonic devices, which delineates the throughput bandwidth available. The second factor is, that to effectively meet the bit error rate requirements of the commercial industry desired $10^{-18}$ or more realistic $10^{-15}$, differential logic architectures have been implemented which currently require two fibers per interconnect. Both of these factors impact cost and bandwidth considerations. The instant invention is directed to these issues.

SUMMARY OF THE INVENTION

It is an object of the invention to provide for a reduction in the fiber count of equivalent commercial configurations by at least 2:1 with the potential for reductions in fiber utilization of 4:1, with the inherent attendant reduction in cost or the possibility of built in redundancy without significant added cost.

The invention, simply described, makes use of VCSEL arrays and detector arrays of commercially available pitch and operating characteristics that are compatible with commercially available optical fiber sizes. The array design is modified and fabricated as multi-frequency arrays with selected VCSELs and detectors arranged in a selected pattern operating at a selected frequency, and other VCSELs and detectors arranged in a related pattern and operating at another selected frequency. The modification to the standard commercial design, and fabrication of the modified array, is within the scope of the present fiber optic chip technology, and need only be attended with close attention and practice to achieve the required results.

The VCSEL arrays and corresponding detector arrays are arranged by the mask design and fabrication to provide groupings of VCSELs of different frequencies and corresponding detectors of the same frequency set, but still at the same average pitch as the original commercial design. Each transmitting group is then coupled to its respective receiving group by a single, multi-mode fiber of the same core diameter as contemplated by the original commercial array design, so that multiple frequencies, such as two frequencies for a differential signal transmission channel, can be transmitted through a single fiber. This technique requires only half as many, or fewer, fibers between the transmitting array and the receiving array, as compared to the equivalent commercial norm.

DESCRIPTION OF PREFERRED EMBODIMENT

Figure 1:
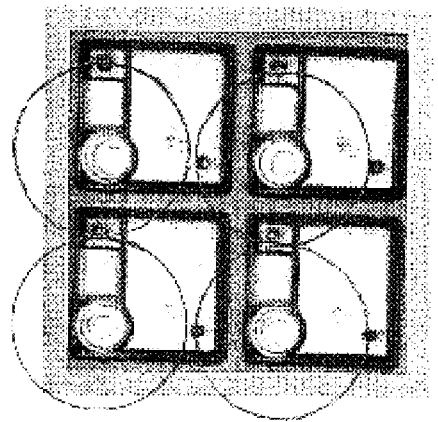
FIG. 1 is a partial top view of a VCSEL array of the prior art, with a single VCSEL per fiber pattern.

As discussed in the background section, in the 850 nanometer optical link arrays that are in use today the separation between the active lasers is 125 microns, as illustrated by prior art FIG. 1. They are implemented this way for a couple of reasons. First, for cost considerations this is the industry standard configuration that is manufactured by the VCSEL vendors. Second, the industry standard and most commonly used optical fiber outside diameter for a single mode fiber with a 62.5 core, is 125 microns. This allows for reasonably easy alignment of the fibers to the VCSEL and detector arrays with a suitable connector. The alignment is done by controlling the fiber alignment installation into the fiber bundle connectors and by matching of corner fibers by light beam detection between transmitting and receiving arrays through the connectors and fiber bundle.

The larger circles in prior art FIG. 1 represent the outside diameter of the fiber optic cables and the small circle in the center of the large circle is the active laser element of the VCSEL. The pitch or distance between the laser centers is a 125 micron by 125 micron footprint, corresponding to a square pattern at the fiber diameter dimension. Arrays of these VCSELs have been made from 16×16 up to 128×128. These arrays have been hybridized onto CMOS ASICs and fanouts to drive the lasers. Detector arrays of the same proportions are likewise readily available.

The most basic embodiment of the invention that meets the objective of using less fiber overall, is to simply rearrange the mask set to align alternate columns (or rows) of lasers to the adjacent corners of their respective existing footprints, so that with a slight offset in the original connector alignment, two lasers can fire into the same 62.5 micron core.

This two-VCSEL/fiber arrangement provides the option to configure for redundancy in case of VCSEL failure. It can be implemented in a mode where both are concurrently operated with the same signal at the same time, providing unmonitored, full time, redundancy. The redundant use of VCSELs makes this approach more costly and therefore it would only be used in cases were an outage that could not wait for another circuit to pick up the load would cause grave consequences. A more likely configuration, a preferred embodiment mode in order to reduce heat and power consumption in the array, is that the supporting circuitry be configured with VCSEL monitoring, whether by direct sensing or by feedback from the detector end of the link, to provide that only one VCSEL is active unless or until it fails, upon which condition the other VCSEL would then be activated. Either way, the link can be terminated with one detector as is done by convention, or with two detectors, using the methodology described.

The 850 nanometer VCSELs are currently fabricated to a tolerance of +/−2 nanometers. As will be appreciated by those skilled in the art, changing the wavelength of the light produced by alternate rows or columns of VCSELs by +/−10 to 20 nanometers requires either compression or expansion of the quantum well structure in the growth plane and some minor adjustments to the mirrors. For example, there may be grown two epitaxial structures such that a first pattern wafer of VCSELs is produced at 850 and a second pattern wafer is produced at 870 nanometers. A nominal 20 nanometer frequency differential remains with in the general capability of the VCSEL fabricators, and yet provides adequate frequency separation for good signal detection at the receiving end.

Figure 2:
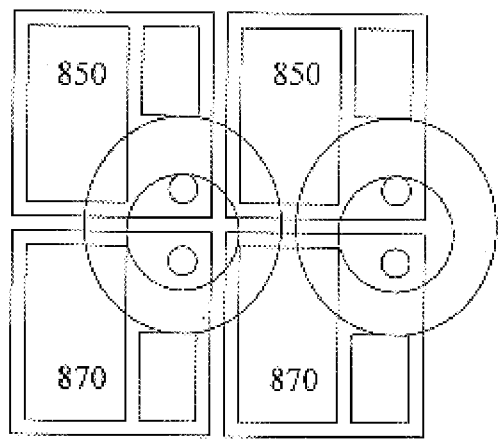
FIG. 2 is a top view diagram of a VCSEL array of a first preferred embodiment with a two VCSEL per fiber pattern.

Then fabricating the devices using mask sets that place the lasers as adjacent corner pairs within their respective footprints, provides a modified commercial design of standard dimensions and normal operating characteristics, and therefore cost effective, which allows light at two different wavelengths to travel down the same fiber core, as illustrated in FIG. 2.

A further preferred embodiment for using less fiber based on commercially available array designs, is to use interdigitated hybridization of VCSELs and detectors at each end of the link, where corresponding detector/emitter sets are both looking into the same fiber at each end. Suitable supporting circuitry in the array substrate can be implemented by current technology to support this configuration. Interdigitated hybridization of VCSELs and detectors in a 16×16 array has been accomplished at 125 micron pitch. This topology provides for two way communication in a single fiber of standard dimensions. In the case illustrated in FIG. 3, a realignment of the standard pitch optical fiber connector would allow corresponding 125 pitch devices to look into the same fiber core. Since the photons are traveling in opposite directions and the light would not be in phase on a continuing basis this approach provides a simple means to fiber count reduction.

Figure 4:
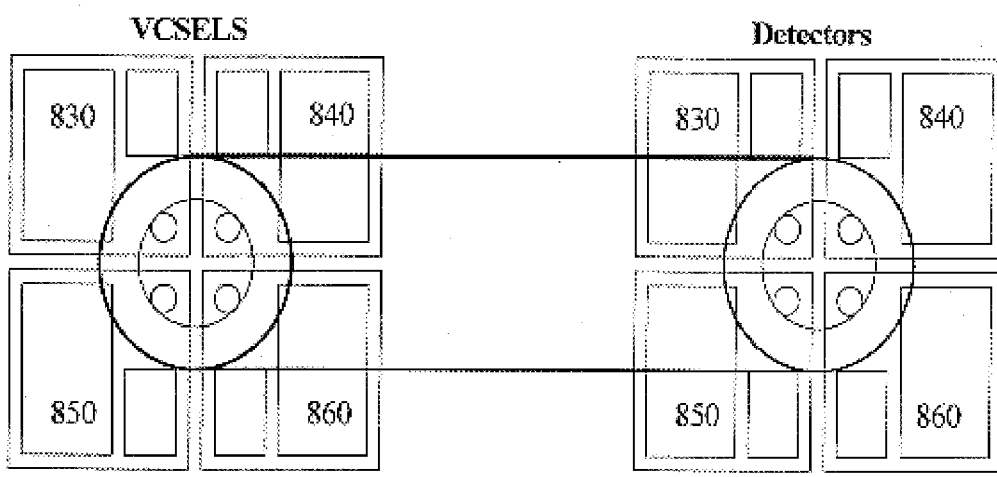
FIG. 4 is a four VCSEL pattern array connected by a single fiber to a corresponding four detector array.

The ability to even further reduce fiber count while using arrays with standard size pixel footprints may be realized by using a set of four VCSELs at discreet wavelengths coupled into the same fiber, by doing quadruple hybridization of devices with adjacent laser apertures. The detection is accomplished with quantum well structure detectors that are tuned and calibrated for the four different wavelengths of received light. FIG. 4 depicts this embodiment of the invention, emitters 830, 840, 850 and 860 and corresponding detectors having those respective wavelengths in nanometers. In this case, a micro lens may be useful at both ends of the fiber to consolidate the light at the emitter end and distribute it at the detector end.

Figure 3:
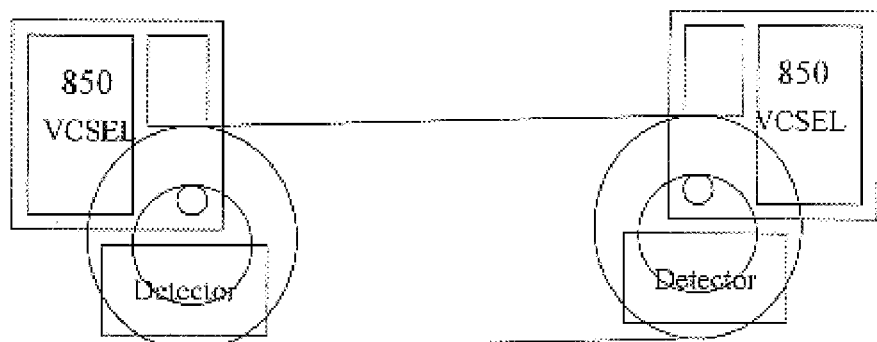
FIG. 3 is a single fiber, dual mode optical link diagram showing a VCSEL and detector co-resident on respective arrays, connected by a single fiber.

Similar to the two-VCSEL embodiment of FIG. 3, the four VCSELs may be operated in various advantageous modes depending on bandwidth and redundancy requirements, all as implemented in the supporting circuitry.

As will be readily apparent to those skilled in the art, the invention is susceptible of many other embodiments, all within the scope of the claims that follow. For example, there is an optical data transmission link with improved fiber utilization consisting of a matrix array of N VCSELs having an average pitch by row and column of P microns, where each VCSEL has an allocated surface area footprint of about P by P microns and an effective emitter diameter of E microns, E being less than P.

There is included a corresponding matrix array of detectors of similar pitch, and an optical fiber bundle of fibers of an outer diameter of P microns and a core diameter of C microns, C being at least two times E, the effective emitter diameter of the VCSELs. One end of the optical fiber bundle is connected by a connector to the matrix array of VCSELs. The other end is connected to the matrix array of detectors, preferably with a similar connector.

The matrix array of VCSELs is divided into rows of footprints, each row being grouped into first and second sets of alternate rows. Each row has a centerline running lengthwise through the row through each footprint. Particularly, each VCSEL of the first set of alternate rows is configured at a predetermined uniform position off the centerline within its own allocated footprint. Each VCSEL of the second set is configured at a mirror image position with respect to the first set, off its respective centerline within its respective footprint. This results in a pattern of N/2 pairs of adjacent VCSELs such as illustrated in FIG. 2, all having the same average pitch, but biased in position to create a uniform pattern of pairs of VCSELs. The connector is aligned with the matrix array such that each pair of VCSELs is aligned with a single fiber core. The other end may be connected to one or more detectors.

The array may be 16 by 16 VCSELs or more in size, even up to 128 by 128 or larger. The VCSELs may be configured to operate at about the same wavelength of light, preferably in the range of 850 nanometers. Both VCSELs of each pair may be configured within the supporting circuitry for transmitting the same data stream for redundancy purposes, whether both are on at the same time all the time, or one is turned on if the other is detected to have failed.

Alternatively, the first set of VCSELs may be configured for operating at a first wavelength, while the second set is configured to operate at a second wavelength, preferably both wavelengths being within the range of 800 to 900 nanometers. In this mode, the pair of VCSELs may be configured for differential signal transmission within the single fiber core. The other end of the fiber may be a single, dual wavelength detector, or two detectors. The pitch P may be equal to about 125 micrometers, the fiber outer diameter may be about the same as the array pitch, and the fiber core C may be equal to about 62.5 micrometers, as is commonly used in the industry today.

As another example, there is an optical data transmission link with improved fiber utilization that has an optical fiber bundle terminated by connectors at each end with respective interdigitated matrix arrays of N/2 VCSELs and N/2 photo detectors. The VCSELs and photo detectors may be configured by design and fabrication as patterns or subpatterns of alternate rows or alternate rows and alternate columns of VCSELs and photo detectors. Both VCSELs and photo detectors are referred to for this explanation as elements. Each element has a standard allocated surface area footprint of about P by P microns. The array patterns have an average pitch by row and column of P microns. The VCSELs have an effective emitter diameter of about E microns, and the photo detectors have an effective sensor diameter of about F microns, E and F each being less than pitch P. There is included a optical fiber bundle consisting of fibers of outer diameter P microns and core diameter C microns, C being at least equal to E plus F.

Of note, each matrix array is divided into rows of footprints, the rows being grouped into first and second row sets of alternate rows. Each row has a row centerline running through each footprint in the row. Each element of the first row set is configured at a predetermined uniform position off the row centerline within its respective footprint. Each element of the second row set is configured at a mirror image position with respect to the first row set off its respective row centerline in its respective footprint. This results in a pattern of N/2 element pairs, where each pair consists of one VCSEL and one photo detector. The connectors are aligned with their respective matrix arrays such that corresponding element pairs of each array are aligned with a respective single fiber core.

The VCSELs and photo detectors are be configured to operate at the same wavelength of light, preferably 850 nanometers, with the footprint pitch being about 125 micrometers and the fiber core being about 62.5 micrometers. The FIG. 3 illustration is representative in part, of this example.

As yet another example, an extension of the previous example, there is an optical data transmission link as above, with an optical fiber bundle terminated by connectors at each end with respective interdigitated matrix arrays of N/2 VCSELs and N/2 photo detectors, where the VCSELs and photo detectors are all referred to as elements, and the elements alternate between VCSEL and detector by row, column, or both. Notably, each matrix array is divided into rows of footprints, the rows being grouped into first and second row sets of alternate rows. As above, each row has a row centerline running through each footprint in the row. Each element of the first row set is configured at a predetermined uniform position off the row centerline within its respective footprint, and each element of the second row set is configured at a mirror image position with respect to the first row set off its respective row centerline in its respective footprint.

Distinguished from the above example, each matrix array is likewise divided into columns of footprints. The columns are grouped into first and second column sets of alternate columns. Each column has a column centerline running through each footprint in the column. Each element of the first column set is configured at a predetermined uniform position off the column centerline within its respective footprint, and each element of the second column set is configured at a mirror image position with respect to the first column set off its respective column centerline in its respective footprint. This orthogonal mirror imaging of element offsets within their respective footprints, in both rows and columns, results in a pattern of N/4, four-element sets, each four-element set including two VCSELs and two photo detectors.

As in prior examples, the connectors are aligned with their respective matrix arrays so that corresponding four-element sets in each array are aligned with a respective single fiber core, with two VCSEL/detector sets operating in each direction.

The two VCSELs in each four-element set may be configured for operating on different wavelengths, such as by having the VCSELs common to the first row or column set configured for operating at a first wavelength, and the VCSELs common to the second row or column set configured for operating at a second wavelength. This permits the link to be operated as a redundant, bi-directional link; a two channel bi-directional link; or a bi-directional, differential transmission link, all within a single fiber, as may be configured within the supporting circuitry and host control system.

As yet another example, there is an optical data transmission link with improved fiber utilization consisting of a matrix array of N VCSELs with an average pitch by row and column of P microns, where each VCSEL has an allocated surface area footprint of about P by P microns and an effective emitter diameter of E microns, E being less than P, as has been previously described. There is a matrix array of detectors and an optical fiber bundle of fibers of outer diameter P microns and core diameter C microns, C being at least two times E. A first end of the optical fiber bundle is connected by a connector to the matrix array of VCSELs, and the other end of the optical fiber bundle is connected to the matrix array of detectors.

The matrix array of VCSELs is divided into rows of footprints, the rows being grouped into first and second row sets of alternate rows. Each row has a row centerline running through each footprint in the row. In particular, each VCSEL of the first row set is configured at a predetermined uniform position off the row centerline within its respective footprint, and each VCSEL of the second row set is configured at a mirror image position with respect to the first row set, off its respective row centerline in its respective footprint.

The matrix array of VCSELs is likewise divided into columns of footprints. The columns are then grouped into first and second column sets of alternate columns. Each column has a column centerline running through each footprint in the column. More particularly, each VCSEL of the first column set is configured at a predetermined uniform position off the column centerline within its respective footprint. Each VCSEL of the second column set is configured at a mirror image position with respect to the first column set off its respective column centerline in its respective footprint. The combination of the mirror image alternate row sets and the mirror image alternate column sets results in a pattern of N/4 quad sets of four adjacent VCSELS, in an array retaining the same average pitch, as illustrated in FIG. 4.

The connector is aligned with the matrix array such that each quad set of VCSELs is aligned with a first terminal end of a single fiber core. The VCSELs common to the first row set may be configured for operating at a first wavelength, while the VCSELs common to the second row set are configured for operating at a second wavelength. This allows, within each quad set, for redundant operation as between the two VCSELS common to the first row set, and as between the two VCSELs common to the second row set, as would be configured within the supporting circuitry of the chip.

Then further, the first row VCSELS and the second row VCSELs can be configured within the supporting circuitry for differential signal transmission, within the single fiber core. The two wavelengths are preferably 20 nanometers apart, within the range of 800 to 900 nanometers. As in other examples, the pitch P is preferably 125 micrometers, C equal to about 62.5 micrometers. This provides both redundancy and differential signal transmission within the same link, all at wavelengths, and with pitch dimensions and fiber sizes commonly used in industry today.

The quad set example can be configured within the above parameters for transmission at four wavelengths, each VCSEL at a discreet wavelength, by the following design and fabrication scheme. The VCSELs common to the first row set and the first column set are configured for operating at a first wavelength. The VCSELs common to the first row set and the second column set are configured for operating at a second wavelength. The VCSELs common to the second row set and the first column set are configured for operating at a third wavelength. And the VCSELs common to the second row set and the second column set are configured for operating at a fourth wavelength. The wavelengths are again preferably 20 nanometers apart within the range of 800 to 900 nanometers. Similar or suitable detector configurations at the other end of the fiber permit four channels or streams of data, or two differential data streams.

Still other examples within the scope of the claims will be apparent to those skilled in the art.

I claim:

1. An optical data transmission link with improved fiber utilization comprising a matrix array of N VCSELs having an average pitch by row and column of P microns, each said VCSEL having an allocated surface area footprint of about P by P microns and an effective emitter diameter of E microns, E being less than P, a matrix array of detectors, an optical fiber bundle of fibers of outer diameter P microns and core diameter C microns, C being at least two times E, a first end of said optical fiber bundle being connected by a connector to said matrix array of VCSELs, a second end of said optical fiber bundle being connected to said matrix array of detectors, said matrix array of VCSELs being divided into rows of said footprints, said rows being grouped into first and second sets of alternate rows, each said row having a centerline running through each footprint in said row, each said VCSEL of said first set configured at a predetermined uniform position off said centerline within its respective said footprint, each said VCSEL of said second set configured at a mirror image position with respect to said first set off its respective said centerline in its respective said footprint, thereby resulting in a pattern of N/2 pairs of adjacent said VCSELs, said connector being aligned with said matrix array such that each said pair of said VCSELs is aligned with a single fiber core.

2. The optical data transmission link with improved fiber utilization according to claim 1, said array comprising at least 16 by 16 VCSELs.

3. The optical data transmission link with improved fiber utilization according to claim 1, said array comprising 128 by 128 VCSELS.

4. The optical data transmission link with improved fiber utilization according to claim 1, all said VCSELs configured to operate at about the same wavelength of light.

5. The optical data transmission link with improved fiber utilization according to claim 4, said wavelength being 850 nanometers.

6. The optical data transmission link with improved fiber utilization according to claim 5, both VCSELs of each said pair of said VCSELs configured for transmitting a common side of a common data stream.

7. The optical data transmission link with improved fiber utilization according to claim 1, said first set of said VCSELs operating at a first wavelength, said second set of VCSELs configured to operate at a second said wavelength.

8. The optical data transmission link with improved fiber utilization according to claim 7, said wavelengths being within the range of 800 to 900 nanometers.

9. The optical data transmission link with improved fiber utilization according to claim 8, a said pair of said VCSELs configured for differential signal transmission within said single fiber core.

10. The optical data transmission link with improved fiber utilization according to claim 1, P equal to about 125 micrometers, C equal to about 62.5 micrometers.

11. An optical data transmission link with improved fiber utilization comprising an optical fiber bundle terminated by connectors at each end with respective interdigitated matrix arrays of N/2 VCSELs and N/2 photo detectors, said VCSELs and said photo detectors all referred to as elements, each said element having a standard allocated surface area footprint of about P by P microns; said arrays having an average pitch by row and column of P microns, said VCSELs having an effective emitter diameter of about E microns, said photo detectors having an effective sensor diameter of about F microns, E and F each being less than P, said optical fiber bundle comprising fibers of outer diameter P microns and core diameter C microns, C being at least equal to E plus F, each said matrix array being divided into rows of said footprints, said rows being grouped into first and second row sets of alternate rows, each said row having a row centerline running through each footprint in said row, each said element of said first row set configured at a predetermined uniform position off said row centerline within its respective said footprint, each said element of said second row set configured at a mirror image position with respect to said first row set off its respective said row centerline in its respective said footprint, thereby resulting in a pattern of N/2 element pairs, each said pair comprising one said VCSEL and one said photo detector, said connectors being aligned with respective said matrix arrays such that corresponding said element pairs of each array are aligned with a respective single fiber core.

12. The optical data transmission link with improved fiber utilization according to claim 11, said array comprising at least 16 by 16 interdigitated said VCSELs and photo detectors.

13. The optical data transmission link with improved fiber utilization according to claim 11, said array comprising 128 by 128 interdigitated said VCSELS and photo detectors.

14. The optical data transmission link with improved fiber utilization according to claim 11, all said VCSELs and photo detectors configured to operate at about the same wavelength of light.

15. The optical data transmission link with improved fiber utilization according to claim 14, said wavelength being 850 nanometers.

16. The optical data transmission link with improved fiber utilization according to claim 11, P equal to about 125 micrometers, C equal to about 62.5 micrometers.

17. An optical data transmission link with improved fiber utilization comprising an optical fiber bundle terminated by connectors at each end with respective interdigitated matrix arrays of N/2 VCSELs and N/2 photo detectors, said VCSELs and said photo detectors all referred to as elements, each said element having a standard allocated surface area footprint of about P by P microns, said arrays having an average pitch by row and column of P microns, said VCSELs having an effective emitter diameter of about E microns, said photo detectors having an effective sensor diameter of about F microns, E and F each being less than P, said optical fiber bundle comprising fibers of outer diameter P microns and core diameter C microns, C being at least equal to E plus F, each said matrix array being divided into rows of said footprints, said rows being grouped into first and second row sets of alternate rows, each said row having a row centerline running through each footprint in said row, each said element of said first row set configured at a predetermined uniform position off said row centerline within its respective said footprint, each said element of said second row set configured at a mirror image position with respect to said first row set off its respective said row centerline in its respective said footprint, each said matrix array being likewise divided into columns of said footprints, said columns being grouped into first and second column sets of alternate columns, each said column having a column centerline running through each footprint in said column, each said element of said first column set configured at a predetermined uniform position off said column centerline within its respective said footprint, each said element of said second column set configured at a mirror image position with respect to said first column set off its respective said column centerline in its respective said footprint, thereby resulting in a pattern of N/4 four element sets, each four element set including two said VCSELs and two said photo detectors.

said connectors being aligned with respective said matrix arrays such that corresponding said four element sets of each array are aligned with a respective single fiber core.

18. The optical data transmission link with improved fiber utilization according to claim 17, said VCSELs common to said first row set configured for operating at a first wavelength, said VCSELs common to said second row set configured for operating at a second said wavelength, each four element set having a first row set VSCEL and a second row set VCSEL.

19. The optical data transmission link with improved fiber utilization according to claim 18, said wavelengths being within the range of 800 to 900 nanometers.

20. The optical data transmission link with improved fiber utilization according to claim 19, pitch P equal to about 125 micrometers, core diameter C equal to about 62.5 micrometers.

21. An optical data transmission link with improved fiber utilization comprising a matrix array of N VCSELs having an average pitch by row and column of P microns, each said VCSEL having an allocated surface area footprint of about P by P microns and an effective emitter diameter of E microns, E being less than P, a matrix array of detectors, an optical fiber bundle of fibers of outer diameter P microns and core diameter C microns, C being at least two times E, a first end of said optical fiber bundle being connected by a connector to said matrix array of VCSELs, a second end of said optical fiber bundle being connected to said matrix array of detectors, said matrix array of VCSELs being divided into rows of said footprints, said rows being grouped into first and second row sets of alternate rows, each said row having a row centerline running through each footprint in said row, each said VCSEL of said first row set configured at a predetermined uniform position off said row centerline within its respective said footprint, each said VCSEL of said second row set configured at a mirror image position with respect to said first row set off its respective said row centerline in its respective said footprint, said matrix array of VCSELs being likewise divided into columns of said footprints, said columns being grouped into first and second column sets of alternate columns, each said column having a column centerline running through each footprint in said column, each said VCSEL of said first column set configured at a predetermined uniform position off said column centerline within its respective said footprint, each said VCSEL of said second column set configured at a mirror image position with respect to said first column set off its respective said column centerline in its respective said footprint, thereby resulting in a pattern of N/4 quad sets of four adjacent said VCSELS, said connector being aligned with said matrix array such that each said quad set is aligned with a first terminal end of a single fiber core.

22. The optical data transmission link with improved fiber utilization according to claim 21, said array comprising at least 16 by 16 VCSELs.

23. The optical data transmission link with improved fiber utilization according to claim 21, said array comprising 128 by 128 VCSELS.

24. The optical data transmission link with improved fiber utilization according to claim 21, said VCSELs common to said first row set configured for operating at a first wavelength, said VCSELs common to said second row set configured for operating at a second said wavelength.

25. The optical data transmission link with improved fiber utilization according to claim 24, where within each said quad set, said VCSELS common to said first row set are configured within supporting circuitry for redundant operation, said VCSELS common to said second row are configured within said supporting circuitry for redundant operation, and said first row VCSELS and said second row VCSELs are configured within said supporting circuitry for differential signal transmission within said single fiber core.

26. The optical data transmission link with improved fiber utilization according to claim 25, said wavelengths being within the range of 800 to 900 nanometers.

27. The optical data transmission link with improved fiber utilization according to claim 26, P equal to about 125 micrometers, C equal to about 62.5 micrometers.

28. The optical data transmission link with improved fiber utilization according to claim 21, said VCSELs common to said first row set and said first column set configured for operating at a first wavelength, said VCSELs common to said first row set and said second column set configured for operating at a second said wavelength, said VCSELs common to said second row set and said first column set configured for operating at a third said wavelength, said VCSELs common to said second row set and said second column set configured for operating at a fourth said wavelength.

29. The optical data transmission link with improved fiber utilization according to claim 28, said wavelengths being within the range of 800 to 900 nanometers.

30. The optical data transmission link with improved fiber utilization according to claim 29, P equal to about 125 micrometers, C equal to about 62.5 micrometers.

* * * * *

UNITED STATES PATENT AND TRADEMARK OFFICE
CERTIFICATE OF CORRECTION

PATENT NO.     : 6,695,493 B2
DATED          : February 24, 2004
INVENTOR(S)    : Jon T. Ciemiewicz It is certified that error appears in the above-identified patent and that said Letters Patent is hereby corrected as shown below:

Title page,
Item [12], delete "Ciemiewcz", insert -- Ciemiewicz --
Item [75], Inventors, "Ciemiewcz", insert -- Ciemiewicz --

Column 10,
Line 12, delete "detectors.", insert -- detectors --

Column 11,
Line 22, delete "redunant", insert -- redundant --

Signed and Sealed this

Second Day of November, 2004

JON W. DUDAS
*Director of the United States Patent and Trademark Office*